US009291747B2

(12) United States Patent
Fournand et al.

(10) Patent No.: US 9,291,747 B2
(45) Date of Patent: Mar. 22, 2016

(54) OPTICAL ARTICLE COMPRISING AN ANTI-REFLECTING COATING HAVING ANTI-FOGGING PROPERTIES

(75) Inventors: Gerald Fournand, Tampa, FL (US); Agnes Jallouli, Largo, FL (US)

(73) Assignee: Essilor International (Compagnie Generale D'Optique), Charenton Le Pont (FR)

( * ) Notice: Subject to any disclaimer, the term of this patent is extended or adjusted under 35 U.S.C. 154(b) by 696 days.

(21) Appl. No.: 13/577,814

(22) PCT Filed: Feb. 7, 2011

(86) PCT No.: PCT/EP2011/051758
§ 371 (c)(1),
(2), (4) Date: Aug. 8, 2012

(87) PCT Pub. No.: WO2011/095626
PCT Pub. Date: Aug. 11, 2011

(65) Prior Publication Data
US 2012/0300170 A1    Nov. 29, 2012

Related U.S. Application Data (60) Provisional application No. 61/302,380, filed on Feb. 8, 2010.

(51) Int. Cl.
G02C 7/02 (2006.01)
G02B 1/115 (2015.01)
G02B 27/00 (2006.01)

(52) U.S. Cl.
CPC ............ G02B 1/115 (2013.01); G02B 27/0006 (2013.01); G02C 7/022 (2013.01); G02C 2202/12 (2013.01)

(58) Field of Classification Search
CPC ........ G02C 7/104; G02C 11/08; G02C 7/022; G02C 2202/12; C03C 17/3681; G02B 1/11; G02B 1/115
USPC ........... 351/62, 159.57, 159.01; 427/165, 167
See application file for complete search history.

(56) References Cited

U.S. PATENT DOCUMENTS

| 6,542,302 B2* | 4/2003 | Cross | 359/581 |
| 2004/0201895 A1 | 10/2004 | Cross | 359/582 |
| 2008/0261008 A1* | 10/2008 | Kiyokawa et al. | 428/216 |
| 2009/0104385 A1* | 4/2009 | Reymond et al. | 428/34 |
| 2010/0035069 A1 | 2/2010 | Li et al. | 428/447 |
| 2010/0104838 A1* | 4/2010 | Noguchi et al. | 428/212 |

FOREIGN PATENT DOCUMENTS

| FR | EP 0 745 620 | 12/1996 |
| JP | 2004-317539 | 11/2004 |
| WO | WO/96/41215 | 12/1996 |
| WO | WO/03/027729 | 4/2003 |

* cited by examiner

Primary Examiner — Huy K Mai
(74) Attorney, Agent, or Firm — Norton Rose Fulbright US LLP (57) ABSTRACT

An optical article having anti-fogging properties is disclosed. The optical article includes an anti-reflecting coating having anti-fogging properties even when the optical articles are provided with an anti-soiling top coat layer. The optical article may particularly find use in ophthalmic lenses, including eyeglass lenses.

24 Claims, 5 Drawing Sheets

OPTICAL ARTICLE COMPRISING AN ANTI-REFLECTING COATING HAVING ANTI-FOGGING PROPERTIES

This application is a national phase application under 35 U.S.C. §371 of International Application No. PCT/EP2011/051758 filed 7 Feb. 2011, which claims priority to U.S. Provisional Application No. 61/302,380 filed 8 Feb. 2010. The entire contents of each of the above-referenced disclosures is specifically incorporated herein by reference without disclaimer.

BACKGROUND OF THE INVENTION

The present invention relates to optical articles, in particular ophthalmic lenses, especially for eyeglass lenses, comprising an anti-reflecting coating which also imparts to the articles anti-fogging properties even when the optical articles are provided with an anti-soiling coating (top coat).

1. Field of the Invention

In the ophthalmic optics field, ophthalmic lenses are traditionally provided with various coatings so as to give these lenses a plurality of mechanical and/or optical properties. Successive coating layers are thus traditionally formed onto an ophthalmic lens, such as impact-resistant coating layers, abrasion and/or scratch resistant coating layers (hard coatings), anti-reflecting coating layers (AR coatings), antistatic coating layers and anti-soiling coating layers (top coats).

As defined hereunder, an AR coating means a coating that has been deposited onto the surface of an optical article, which does improve the antireflective properties of the optical end product. It makes it possible to reduce the light reflection at the article-air interface area within a relatively large portion of the visible light spectrum.

More precisely, an AR coating provides a Rv of 2.5% or less (per face of a coated lens). The mean reflectance factor Rv is such as defined in ISO standard 13666:1998 and measured in accordance with ISO standard 8980-4, i.e. it is the balanced average spectral reflection in the visible spectrum in the wavelengths limits ranging from 380 nm to 780 nm.

Fogging of ophthalmic lenses is troublesome for the wearer, and can be unsafe as it will reduce wearer's vision and even in some cases "blind" him.

Fogging will occur when the temperature of the lens is lower than that of its environment. Then, humidity contained within the air surrounding the lens will condense on the colder surface of the lens.

2. Description of Related Art

Different solutions for reducing the fogging propensity of ophthalmic lenses are commercially available.

A first solution is the use of an anti-fogging temporary solution, generally comprising poly(oxyalkylene) surfactants. Temporary solutions have to be applied frequently on the lens surfaces and their efficiency is highly questionable, especially in the case of lenses provided with an anti-soiling coating.

JP2004-317539 describes a process for preparing an optical article, especially a lens having antifogging properties which comprises treating a base article with a treatment agent comprising a hydrophobic part containing fluorine atoms, a hydrophilic part comprising a polyoxyethylene group and a coupling unit, such as an alkoxysilane, that reacts with the surface of the article to form an article whose surface has a contact angle with water from 50 to 90°. This article is then treated by a surfactant having a HLB value from 5 to 15 in order to get an antifogging layer.

A second solution is the use of anti-abrasion coatings having anti-fogging properties. The drawback of this solution is that these coatings are very soft and leads to easily soiled lenses, with generally poor abrasion resistance. They have no antireflective properties.

SUMMARY OF THE INVENTION

It is therefore an object of the present invention to provide a transparent optical article, especially an ophthalmic lens, having anti-fogging properties without requiring the use of a temporary solution.

It is a further object of the present invention to provide a transparent optical article, as above, without impairing other beneficial properties such as antistatic, anti-abrasion and/or anti-scratch, impact resistance, anti-reflecting and anti-soiling properties.

The aforementioned objectives are achieved according to the present invention by providing an optical article, in particular an ophthalmic lens, which comprises an anti-reflecting coating which imparts to the article anti-fogging properties.

More specifically, according to the invention, there is provided an optical article, in particular an ophthalmic lens, having anti-fogging properties, comprising a substrate having at least one main face coated with an anti-reflecting stack of layers of low refractive index (LI) and high refractive index (HI) layers including an outermost and an innermost layer, wherein the outermost layer of the anti-reflecting stack is a sandwich layer comprising a core portion interleaved between two side portions, said core portion being made of $SiO_2$, $SiO_x$ with $1 \leq x < 2$, a mixture of $SiO_2$ and $SiO_x$ or a mixture of $SiO_2$ and/or SiOx with 10% by weight or less, based on the total weight of the mixture, of $Al2O_3$, having a physical thickness ranging from 20 to 150 nm, preferably 30 to 80 nm and being formed by vacuum evaporation deposition in a vacuum chamber at a deposition rate of at least 1.10 nm/s and/or maintaining a pressure higher than or equal to $1 \times 10^{-4}$ mbar and preferably ranging from $1.2 \times 10^{-4}$ mbar to $5 \times 10^{-4}$ mbar in said vacuum chamber during deposition by introducing inside said vacuum chamber at least one gas selected from the group consisting of oxygen, an inert gas or a mixture thereof, the side portions being made of a material selected from the same materials as for the core portion, having a physical thickness of 1 to 50 nm, preferably 2 to 20 nm and being formed by vacuum evaporation deposition at a deposition rate of less than 1.10 nm/s and maintaining a pressure ranging from $1 \times 10^{-5}$ mbar to less than $1 \times 10^{-4}$ mbar, preferably from $0.2 \times 0.10^{-4}$ to $0.5 \times 10^{-4}$ mbar inside the vacuum chamber, optionally by introducing at least one gas selected from the same group as for the core portion, and, wherein the innermost layer is made of a material selected from the same group as for the core portion of the outermost layer, said innermost layer having a physical thickness ranging from 50 to 500 nm, preferably from 100 to 300 nm and being formed by vacuum evaporation deposition at a deposition rate of at least 1.10 nm/s and/or maintaining a pressure higher than $1 \times 10^{-4}$ mbar and preferably ranging from $1.2 \times 10^{-4}$ mbar to $5 \times 10^{-4}$ mbar by introducing inside the vacuum chamber at least one gas selected from the group consisting of oxygen, an inert gas or a mixture thereof.

Preferably, the physical thickness of the side portions of the outermost sandwich layer of the anti-reflecting stack ranges from 4 to 20 nm.

In one embodiment, the side portions are formed by gradually modifying the deposition rate and/or the gas pressure during the vacuum evaporation deposition process, thereby creating a density gradient within the side portions.

In another preferred embodiment the side portions are formed without introducing another gas than the gas of the evaporated materials to deposit ($SiO_2$, $SiO_x$ or $SiO_2$).

Preferably, the material of the outermost and innermost layers of the anti-reflecting stack is $SiO_2$ and the gas used in the vacuum evaporation deposition processes is oxygen or a rare gas such as argon.

In preferred embodiments, the additional layers between the outermost and innermost layers of the anti-reflecting stack are alternate layers of low and high refractive indexes, preferably formed by vacuum evaporation deposition process.

Since the anti-fogging properties of the article of the invention are imparted by the anti-reflecting stack, there is no risk of deterioration of the anti-soiling properties conferred by a top-coat, as it may be the case when solutions are used for imparting or renewing anti-fogging properties.

DESCRIPTION OF ILLUSTRATIVE EMBODIMENTS

As used in this application, when an optical article does comprise one or more coating(s) on its surface, the phrase "depositing a layer or a coating onto the article" means that a layer or a coating is deposited onto the exposed surface of the article external coating.

As used herein, the "article external coating" means the coating that is the most distant from the substrate.

As used herein, a coating that is said to be "on" a substrate or that has been deposited "onto" a substrate is defined as being a coating (i) that is located above the substrate, (ii) that is not necessarily in contact with the substrate, that is to say one or more intermediate coating(s) may be located between the substrate and the coating of interest, and (iii) that does not necessarily totally cover the substrate, although a complete coverage is preferred.

As used herein, when "a layer 1 is located under a layer 2", it means that layer 2 is more distant from the substrate than layer 1 does.

As used herein an "anti-reflecting stack" means a multilayered stack forming the antireflection coating that is deposited on the optical article substrate. In the following description it will be simply referred to as the "anti-reflecting stack".

As used herein, the "innermost" layer of the anti-reflecting stack means the layer of the multilayered stack which is the closest from the substrate, and conversely the "outermost" layer of the anti-reflecting stack means the layer of the multilayered stack which is the farthest from the substrate.

When it is referred to the pressure in the vacuum chamber, this pressure results from the gas present in the chamber due to:

evaporated material(s) to be deposited, if present,
gas introduced by the ion gun ($O_2$, inert or rare gas),
additional gas, if present, such as Ar or $O_2$ introduced to get the required total pressure.

All deposition rates and thicknesses of AR layers in this patent application are corresponding to actual rates and thicknesses on the final product and not programmed rates and thicknesses on the vacuum machine that may differ from actual rates and thicknesses.

Generally speaking, the anti-reflecting stack of the optical article according to the invention may be deposited onto any optical substrate, and preferably onto organic glass substrates such as for example a thermoplastic or a thermosetting material.

Thermoplastic materials that may be suitably used for the substrates include "(meth)acrylic (co)polymers, especially methyl poly(methacrylate) (PMMA), thio(meth)acrylic (co) polymers, polyvinylbutyral (PVB), polycarbonates (PC), polyurethanes (PU), poly(thiourethanes), polyol allylcarbonate (co)polymers, thermoplastic copolymers of ethylene and vinyl acetate, polyesters such as polyethylene terephtalate (PET) or polybutylene terephtalate (PBT), polyepisulfides, polyepoxides, copolymers of polycarbonates and polyesters, copolymers of cycloolefins such as copolymers of ethylene and norbornene or ethylene and cyclopentadiene, and combinations thereof.

As used herein a "(co)polymer" means a copolymer or a polymer. A (meth)acrylate is an acrylate or a methacrylate.

The preferred substrates according to the invention include for example the substrates obtained by polymerizing alkyl (meth)acrylates, especially $C_1$-$C_4$ alkyl(meth)acrylates, such as methyl(meth)acrylates such as polyethoxylated bisphenol di(meth)acrylates, allyl derivatives such as aliphatic or aromatic, linear or branched polyol allycarbonates, thio(meth) acrylates, episulfides and precursor mixtures of polythiols and polyisocyanates (for obtaining polythiourethanes).

As used herein a "polycarbonate" PC means both the homopolycarbonates and the copolycarbonates and the block copolycarbonates. Polycarbonates are commercially available for example from GENERAL ELECTRIC COMPANY under the trade name LEXAN®, from TEIJIN under the trade name PANLITE®, from BAYER under the trade name BAYBLEND®, from MOBAY CHEMICAL Corp. under the trade name MAKROLON® and from DOW CHEMICAL CO. under the trade name CALIBRE®.

Suitable examples of polyol allyl carbonate (copolymers include (co)polymers of ethylene glycol bis(allyl carbonate), of diethylene glycol bis 2-methyl carbonate, of diethylene glycol bis(allyl carbonate), of ethylene glycol bis(2-chloro allyl carbonate), of propoyleneglycol bis(2-ethyl allyl carbonate), of 1,3-butenediol bis(allyl carbonate), of 1,4-butenediol bis(2-bromo allyl carbonate), of dipropyleneglycol bis (allyl carbonate), of trimethylene glycol bis(2-ethyl allyl carbonate), of pentamethylene glycol bis(allyl carbonate), of isopropylene bisphenol-A bis(allyl carbonate).

Particularly recommended substrates are those substrates obtained by (co)polymerizing bis allyl carbonate of diethylene glycol, marketed, for example, under the trade name CR-39® by PPG Industries (ESSILOR ORMA® lenses).

The particularly recommended substrates also include those substrates obtained by polymerizing thio(meth)acrylic monomers, such as those described in the French patent application FR 2734827.

Of course the substrates may be obtained by polymerizing mixtures of the hereinabove mentioned monomers, or they also may comprise mixtures of such polymers and (co)polymers.

Generally speaking, the preferred substrates are those made of a crosslinked material (thermosetting material); especially allylic, (meth)acrylate type, thio(meth)acrylate type or poly(thio)urethane substrates.

As known in the art, the substrates can bear one or more coating(s) that have been deposited before applying the antireflective stack.

Such kind of coatings will be described later.

According to one embodiment of the present invention, the substrate comprises a front face and a rear face, wherein the antireflection coating may be deposited onto at least one of the two faces. It is preferably deposited onto the front and rear faces of the substrate.

As used herein, the "rear face" (typically concave) of the substrate means the face which, in the final article, is located the nearest to the user's eye. On the contrary, the "front face" (typically convex) of the substrate means the face which, in the final article, is the most distant from the user's eye.

Figure 1:
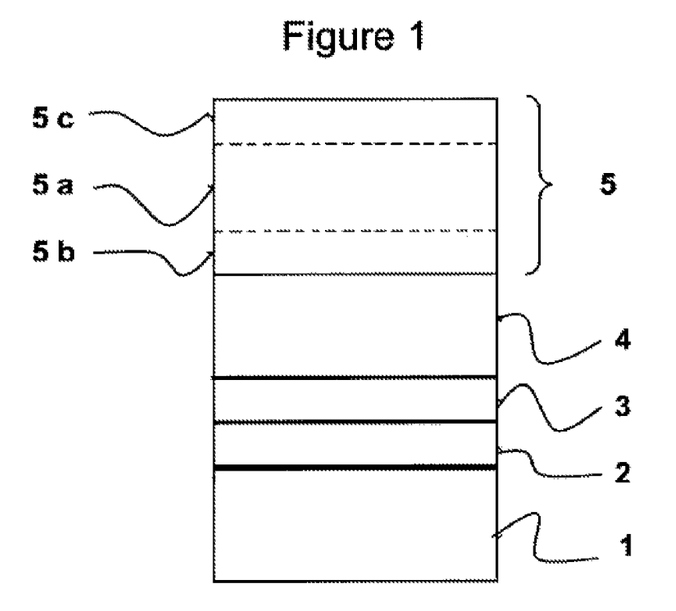
FIG. 1 is a schematic representation of one embodiment of an anti-reflecting stack according to the invention.
Figure 2A:
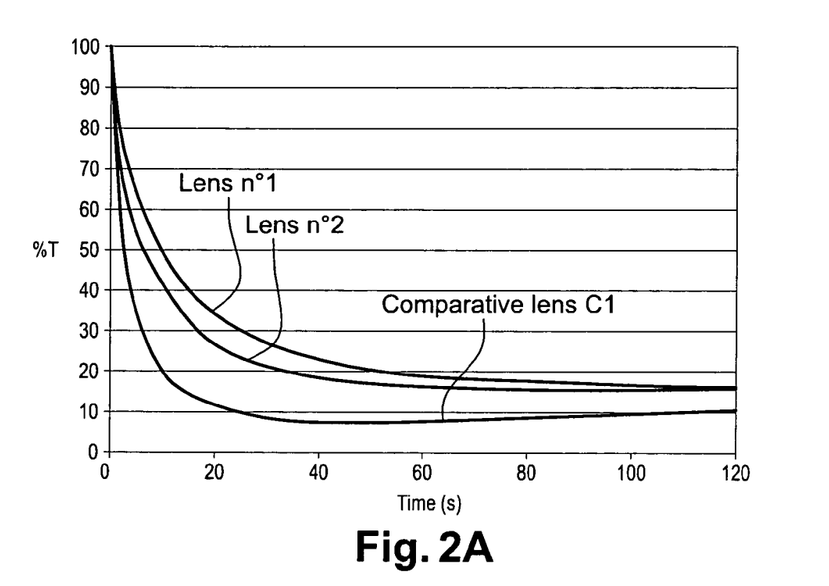
FIGS. 2A to 2D are optical transmission graphs following European standard EN 168, (except that the 100% transmission is measured on the lens before exposure of the lens to warm water vapour) for lenses with anti-reflecting stacks according to the invention and a lens with a classical prior art anti-reflecting stack.
Figure 2B:
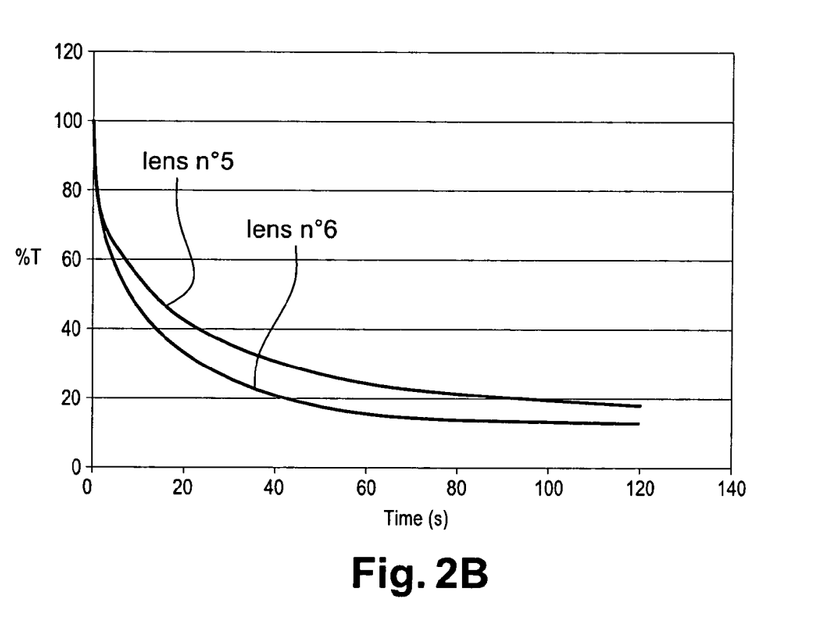
Figure 2C:
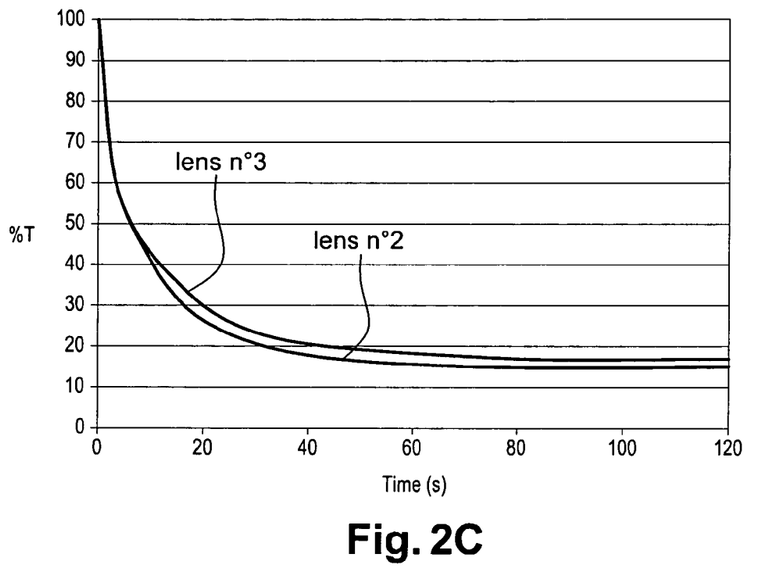
Figure 2D:
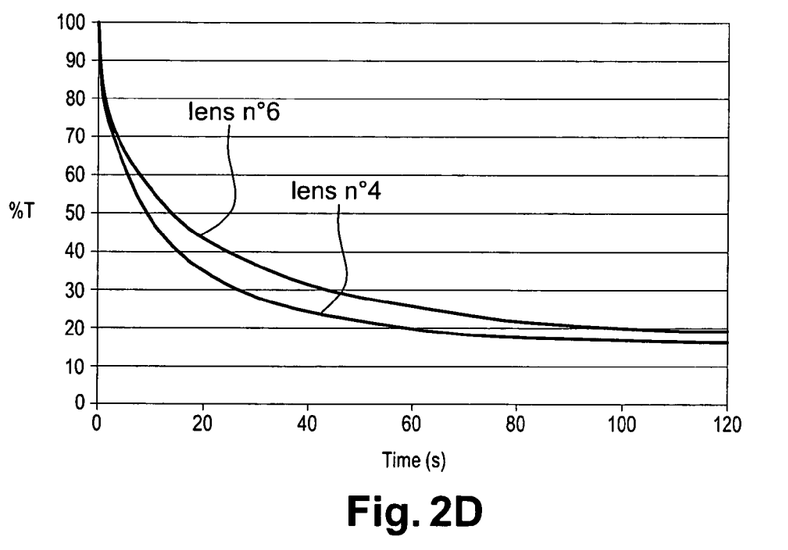

Referring to FIG. 1, there is schematically represented an embodiment of an anti-reflecting stack according to the invention.

Starting from the substrate, the anti-reflecting stack comprises a layer 1 of low refractive index which constitutes the "innermost" layer of the stack. A layer 2 of high refractive index, a layer 3 of low refractive index, a layer 4 of high refractive index and a layer 5 of low refractive index which constitutes the outermost layer of the stack.

According to the invention, outermost layer 5 is a sandwich layer comprising a core portion 5a interleaved between two side portions 5b, 5c.

Both the core portion 5a and the side portions, 5b, 5c are made by vacuum evaporation deposition of $SiO_2$, $SiO_x$ with $1 \leq x < 2$, a mixture of $SiO_2$ and $SiO_x$ or a mixture of $SiO_2$ and/or $SiO_x$ with 10% by weight or less, based on the total weight of the mixture, of $Al_2O_3$. Preferably, layer 5 is made of $SiO_2$.

The core portion 5a of outermost sandwich layer 5 has a physical thickness of 20 to 150 nm and the side portions 5b and 5c have each a physical thickness ranging from 1 to 50 nm, preferably 2 to 50 nm and more preferably 4 to 20 nm.

The core portion 5a of outermost layer 5 is made by classical vacuum evaporation deposition process but using higher deposition rate and/or pressure of oxygen or an inert gas than in usual vacuum evaporation deposition processes used for forming the LI and HI layers of an anti-reflecting stack.

According to the invention the core portion 5a of outermost layer 5 is formed at a deposition rate of 1.10 nm/s or more, preferably 1.17 to 2 nm/s, more preferably 1.5 to 2 nm/s and/or a pressure inside the vacuum chamber higher than or equal to $1 \times 10^{-4}$ mbar, preferably ranging from $1.2 \times 10^{-4}$ mbar to $5 \times 10^{-4}$ mbar, preferably from $2 \times 10^{-4}$ mbar to $5 \times 10^{-4}$ mbar, more preferably from $3 \times 10^{-4}$ mbar to $5 \times 10^{-4}$ mbar by introducing oxygen or an inert gas, such as nitrogen or a rare gas (argon, krypton, xenon and neon), preferably a rare gas.

Preferably the core portion 5a is formed at a deposition rate of 1.10 nm/s or more, preferably 1.17 nm/s or more, and a pressure of oxygen of $1.2 \times 10^{-4}$ mbar or more.

Side portions 5b and 5c are formed at a deposition rate of less than 1.10 nm/s, preferably less than 1 nm/s, typically 0.78 nm/s, and with a pressure in the vacuum chamber below $1 \times 10^{-4}$ mbar, preferably below $0.5 \times 10^{-4}$ mbar. Preferably no gas other than the gas of the evaporated materials to deposit ($SiO_2$, $SiO_x$) is present in the vacuum chamber during deposition of side portions 5b, 5c.

Owing to the deposition conditions, the core portion 5a is of lower density than the side portions 5b, 5c, and generally also of the other HI and LI layers of the stack.

Without being bound by a theory, the Inventors believe that by using higher deposition rate and/or higher gas pressure the molecules of the used material, in particular $SiO_2$, in the formed layer are more widely spaced from each others, thus resulting in a less dense layer.

Thus, the core portion of the outermost layer can be qualified as a layer of lower density than the side portions.

Higher deposition rates and higher gas pressures result in a reduced filling of the monomolecular deposited layer.

Of course, deposition of the core and side portions can be implemented in a continuous manner, deposition condition being gradually modified, thus creating a gradient of density between the core portion 5a and the side portions 5b, 5c.

Innermost layer 1 is made by vacuum evaporation deposition using the same materials and same deposition conditions as those described above for the core portion 5a of outermost layer 5. However innermost layer 1 has a physical thickness ranging from 50 to 500 nm. Of course, innermost layer 1 can be a monolayer or a multilayer, provided that, when innermost layer 1 is a multilayer, all sub-layers whose total thickness range from 50 to 500 nm are formed under the specified conditions of the vacuum evaporation process. This layer 1 can also be considered as a layer of lower density than the side portions 5b, 5c of outermost layer 5 and of the other HI and LI layers 2 to 4. Preferably, innermost layer 1 is a monolayer.

Layers 2 to 4 are classical HI and LI layers of an antireflecting stack. For example, layer 2 is a HI layer, layer 3 is a LI layer and layer 4 is a HI layer.

As used herein, a low refractive index layer is intended to mean a layer with a refractive index of 1.55 or less, preferably lower than 1.50 and even better lower than 1.45, and a high refractive index layer is intended to mean a layer with a refractive index higher than 1.55, preferably higher than 1.6, more preferably higher than 1.8 and even better higher than 2, both at a reference wavelength of 550 nm. Unless otherwise noted, all refractive indexes indicated in the present patent application are expressed at 25° C. and $\lambda = 550$ nm.

HI layers are classical high refractive index layers and may comprise, without limitation, one or more mineral oxides such as $TiO_2$, $PrTiO_3$, $LaTiO_3$, $ZrO_2$, $Ta_2O_5$, $Y_2O_3$, $Ce_2O_3$, $La_2O_3$, $Dy_2O_5$, $Nd_2O_5$, $HfO_2$, $Sc_2O_3$, $Pr_2O_3$ or $Al_2O_3$, or $Si_3N_4$, as well as mixtures thereof, preferably $ZrO_2$, $TiO_2$ or $PrTiO_3$. HI layers may optionally contain low refractive index materials such as $SiO_2$. Obviously, mixtures of those compounds are such that the refractive index of the resulting layer is as defined above (higher than 1.55). HI layers preferably do not contain $Nb_2O_5$ and are preferably not prepared by evaporation of a mixture of compounds comprising $Nb_2O_5$.

LI layers are also well known and may comprise, without limitation, $SiO_2$, SiOx with $1 \leq x < 2$, $MgF_2$, $ZrF_4$, $Al_2O_3$, $AlF_3$, chiolite ($Na_3Al_3F_{14}$), cryolite ($Na_3[AlF_6]$), or mixtures thereof, preferably $SiO_2$ or $SiO_2$ doped with $Al_2O_3$ which contributes to raising the critical temperature of the stack. Obviously, mixtures of those compounds are such that the refractive index of the resulting layer is as defined above (lower than or equal to 1.55). When $SiO_2/Al_2O_3$ mixtures are used, the LI layer preferably contains from 1 to 10%, more preferably from 1 to 8% by weight of $Al_2O_3$ relative to the total weight of $SiO_2+Al_2O_3$ in said layer. A too high amount of alumina is detrimental to adhesion of the AR coating.

For example, $SiO_2$ doped with 4% or less $Al_2O_3$ by weight, or $SiO_2$ doped with 8% $Al_2O_3$ by weight may be employed. Commercially available $SiO_2/Al_2O_3$ mixtures can also be employed, such as LIMA™ supplied by Umicore Materials AG (refractive index n=1.48-1.50 at 550 nm), or substance L5™ supplied by Merck KGaA (refractive index n=1.48 at 500 nm). The most preferred material for LI layers is $SiO_2$ doped with 8% $Al_2O_3$ by weight.

Generally, HI layers and LI layers, other than the innermost and outermost layers, have a physical thickness, ranging respectively, from 10 to 120 nm (HI) and 10 to 100 nm (LI).

The anti-reflecting stack of the present invention may include any layer or stack of layers which improves the anti-reflective properties of the finished optical article over at least one portion of the visible spectrum, thereby increasing the transmission of light and reducing surface reflectance.

Preferably, the multi-layer anti-reflecting stack comprises, in addition to the innermost and outermost layers, at least one LI layer and at least two HI layers. Preferably, the total number of layers in the anti-reflection coating is ≤9, preferably ≤7.

LI and HI layers are not necessarily alternated in the AR stack, although the anti-reflection coating may comprise an alternated stack of low refractive index and high refractive index layers according to a particular embodiment of the invention. Two or more HI layers may be deposited on one another; two or more LI layers may be deposited on one another.

In general, the total height of the anti-reflecting stack is less than 1.5 µm, preferably 1 µm or less, and even better 0.75 µm or less.

The HI and LI layers, other than the innermost and outermost layers, can be applied in particular by vacuum deposition according to one of the following techniques:

1)—by evaporation, optionally ion beam-assisted;
2)—by spraying using an ion beam,
3)—by cathode sputtering; or
4)—by plasma-assisted vapor-phase chemical deposition.

These different methods are described in "Thin Film Processes" and "Thin Film Processes II", Vossen & Kern, Ed., Academic Press, 1978 and 1981, respectively. Said evaporation under vacuum is a particularly recommended method.

These layers can also be applied by applying liquid solutions, preferably by a spin coating process.

All antireflection coating layers are preferably deposited by evaporation under vacuum. The evaporation can be implemented by heating, using means known in the art such as electron beam, halogen heating.

It is well known that optical articles tend to become charged with static electricity, particularly when being cleaned under dry conditions by rubbing their surface with a cloth, a piece of synthetic foam or polyester. They can then draw and fix the small particles in their vicinity such as dusts, and this goes on for all the time the charge remains on the article. It is well known in the state of the art that an article may acquire antistatic properties thanks to the presence on its surface of an electrically conductive layer. This method has been applied in patent application WO 01/55752 and in patent EP 0834092.

An article is said to be "antistatic" when it does possess the ability not to retain and/or develop an appreciable electrostatic charge. An article is typically considered as having acceptable antistatic properties when it does not draw and fix dust as well as small particles after one of its surfaces was rubbed by means of a suitable cloth.

There are various methods for quantifying the antistatic properties of a material.

One of such methods does take the material's static potential into account. When the material's static potential (as measured when the article is still uncharged) is 0 KV+/−0.1 KV (absolute value), the material is said to be antistatic, on the contrary when its static potential is different from 0 KV+/−0.1 KV (absolute value), the material is said to be static.

According to another method, the ability for a glass to discharge a static charge after rubbing with a cloth or by any other means suitable for generating an electrostatic charge (corona-applied charge) may be quantified by measuring the dissipation time of said charge. Thus, antistatic glasses do have a discharge time that is about a hundred milliseconds, while it is about several tens of seconds for a static glass, using the known JCI test described in WO2008141981 incorporated herein by reference.

The article of the invention may be made antistatic by incorporating at least one electrically conductive layer into the anti-reflecting stack. The electrically conductive layer may be located in various locations of the anti-reflecting stack, provided its antireflection properties are not impaired. It is preferably located under a low refractive index layer of the anti-reflecting stack.

The electrically conductive layer must be thin enough not to impair the transparency of the antireflection coating. Typically, its thickness does vary from 0.1 to 50 nm.

The electrically conductive layer is preferably made of an electrically conductive and highly transparent material. In that case, its thickness does preferably vary from 0.1 to 30 nm, more preferably from 1 to 20 nm and even more preferably from 1 to 10 nm. The electrically conductive layer preferably comprises a metal oxide selected from indium, tin, and zinc oxide, as well as mixtures thereof. Indium-tin oxide ($In_2O_3$: Sn, i.e. indium oxide doped with tin) and tin oxide ($SnO_2$) are preferred. According to an optimal embodiment, the electrically conductive and optically transparent layer is an indium-tin oxide layer, referred to as ITO layer.

Typically, the electrically conductive layer does contribute to obtain the antireflection properties and form a high refractive index layer in the antireflection coating. That is the case when layers are made of an electrically conductive and highly transparent material such as the ITO layers.

The electrically conductive layer may also be a layer made of a very thin noble metal that is typically less than 1 nm thick, more preferably less than 0.5 nm thick.

The electrically conductive layer, that is typically a high refractive index layer of the antireflection stack, may be deposited according to any suitable method, for example by vacuum deposition, by evaporation, preferably by ion beam assisted deposition (IAD), or by a cathode sputtering or ion beam method.

The substrate on which the anti-reflecting stack of the invention is deposited can be a naked substrate or a substrate having at least one main face already coated with one or more functional coatings such as an impact-resistant coating, a hard abrasion-resistant and/or anti-scratch coating, the anti-reflecting stack being then formed on the exposed surface of the external functional coating of the substrate.

The abrasion-resistant and/or anti-scratch coatings are preferably hard coating based on poly(meth)acrylates or silanes.

The hard abrasion-resistant and/or anti-scratch coatings are preferably produced from compositions comprising at least one alkoxysilane and/or one hydrolysate thereof, obtained for example by hydrolysis with a hydrochloric acid solution. After the hydrolysis step, which duration does typically range from 2 h to 24 h, preferably from 2 h to 6 h, catalysts may optionally be added. A surfactant compound is preferably also added so as to optimize the optical quality of the deposition.

Recommended coatings according to the present invention include coatings based on epoxysilane hydrolysates such as those described in the patents FR 2,702,486 (EP 0,614,957), U.S. Pat. No. 4,211,823 and U.S. Pat. No. 5,015,523.

A preferred abrasion-resistant and/or antiscratch coating composition is the one disclosed in the French patent FR 2,702,486, in the name of the applicant. It comprises an epoxy trialkoxysilane and dialkyl dialkoxysilane hydrolysate, colloidal silica and a catalytic amount of a curing catalyst based on aluminium such as aluminium acetyl acetonate, the rest being for the most part solvents that are traditionally used for formulating such compositions. Preferably the hydrolysate used is a γ-glycidoxypropyl trimethoxysilane (GLYMO) and dimethyldiethoxysilane (DMDES) hydrolysate.

The abrasion-resistant and/or antiscratch coating composition may be deposited onto the substrate's main surface by dipping or spin-coating. It is then cured according to the appropriate method (preferably a thermal or an ultraviolet method).

The thickness of the abrasion-resistant and/or antiscratch coating does typically vary from 2 to 10 μm, preferably from 3 to 5 μm.

Before depositing the abrasion-resistant and/or antiscratch coating, a primer coating may be deposited onto the substrate to improve the impact resistance and/or the adhesion of the following layers in the final product.

This coating may be any impact-resistant primer layer traditionally used for articles made of a transparent polymeric material, such as ophthalmic lenses.

Preferred primer compositions include compositions based on thermoplastic polyurethanes, such as those described in the Japanese patents JP 63-141001 and JP 63-87223, the poly(meth)acrylic type primer compositions, such as those described in the American patent U.S. Pat. No. 5,015,523, thermosetting polyurethane based compositions, such as those described in the European patent EP 0404111 and compositions based on poly(meth)acrylic type latex or polyurethane type latex, such as those described in the patents U.S. Pat. No. 5,316,791 and EP 0680492.

The preferred primer compositions are compositions based on polyurethanes and compositions based on latex, especially polyurethane type latices.

Poly(meth)acrylic type latices are copolymer latices mainly based on a (meth)acrylate, such as for example ethyl, butyl, methoxyethyl or ethoxyethyl(meth)acrylate, with a typically minor amount of at least one other co-monomer, such as for example styrene.

Preferred poly(meth)acrylic type latices are latices based on acrylate-styrene copolymers. Such latices of acrylate-styrene copolymers are commercially available from ZENECA RESINS under the trade name NEOCRYL®.

Polyurethane type latices are also known and commercially available. As an example, polyurethane type latices with polyester units are appropriate. Such latices are also marketed by ZENECA RESINS under the trade name NEOREZ® and by BAXENDEN CHEMICALS under the trade name WITCOBOND®.

Mixtures of these latices may also be used in the primer compositions, especially polyurethane type and poly(meth)acrylic type latices.

These primer compositions may be deposited on the article faces by dipping or spin-coating, then be dried at a temperature of at least 70° C. and up to 100° C., preferably of about 90° C., during a time period ranging from 2 minutes to 2 hours, typically of about 15 minutes, to form primer layers which post-curing thickness does range from 0.2 to 2.5 μm, preferably from 0.5 to 1.5 μm.

Of course, the optical article according to the invention may also comprise coatings formed on the antireflection coating that might be able to modify its surface properties, such as hydrophobic coatings and/or oleophobic coatings (anti-soiling top coat). These coatings are preferably deposited onto the antireflection coating external layer. Their thickness is generally lower than or equal to 10 nm, and does preferably range from 1 to 10 nm, more preferably from 1 to 5 nm.

They are generally fluorosilane or fluorosilazane type coatings. They may be obtained by depositing a fluorosilane or fluorosilazane precursor, comprising preferably at least two hydrolysable groups per molecule. Fluorosilane precursors preferably have fluoropolyether moieties and more preferably perfluoropolyether moieties. These fluorosilanes are well known and are described, inter alia, in the patents U.S. Pat. No. 5,081,192, U.S. Pat. No. 5,763,061, U.S. Pat. No. 6,183,872, U.S. Pat. No. 5,739,639, U.S. Pat. No. 5,922,787, U.S. Pat. No. 6,337,235, U.S. Pat. No. 6,277,485 and EP 0933377. Preferred anti-soiling coating is obtained by evaporation under vacuum of OPTOOL DSX®, a compound marketed by DAIKIN INDUSTRIES (thickness: from 2 to 5 nm).

Typically, an optical article obtained according to the method of the invention comprises a substrate that is successively coated with an impact-resistant primer layer, an abrasion-resistant and/or an antiscratch layer, a sub-layer of the invention, a multilayered stack of the invention and a hydrophobic and/or oleophobic coating. The article of the invention is preferably an optical lens, more preferably an ophthalmic lens for spectacles, or an optical or ophthalmic lens blank. The lens may be a polarized lens or a photochromic lens or a coloured lens.

The coloration may be obtained by incorporating pigments into the lens mass, by impregnation, by depositing coloured layers that do absorb in the visible region.

The following examples illustrate the invention in more detail but without limitation.

EXAMPLES

1. General Procedures

To be Verified and Eventually Completed

Optical articles employed in the examples comprise a substrate ORMA® ESSILOR lens having a 65 mm diameter, base 6 (Base=350/R: radius in mm) with a power of −0.00 dioptres and a thickness of 1.2 mm, coated on both faces with an abrasion-resistant and/or an antiscratch coating (hard coat) disclosed in example 3 of the patent EP 0614957 (refractive index 1.50), based on a hydrolysate of GLYMO and DMDES, of colloidal silica and aluminum acetyl acetonate, with an antireflection coating and lastly with an anti-soiling coating.

The abrasion-resistant coating was obtained by depositing and curing of a composition comprising by weight, 224 parts of GLYMO, 80.5 parts of HCl 0.1 N, 120 parts of DMDES, 718 parts of a 30 weight % colloidal silica in methanol, 15 parts of aluminum acetyl acetonate and 44 parts of ethylcellulose. The composition also comprised 0.1% of the surfactant FLUORAD™ FC-430® (3M) by weight as related to the total weight of the composition. This abrasion-resistant coating was deposited directly onto the substrate.

The anti-reflecting stacks were deposited by evaporation under vacuum in a BAK vacuum Chamber; the evaporation was optionally ion beam assisted where indicated (evaporation source: electron gun).

The anti-soiling coating was obtained by evaporation under vacuum of the Optool DSX® compound marketed by Daikin Industries (thickness: from 2 to 5 nm).

2. Procedures

Example 1 and Comparative Example C1

Ophthalmic lenses n° 1 to 6 as above described were provided with various anti-reflecting stacks according to the invention.

All the anti-reflecting stacks had the same general layer structure comprising, starting from the substrate:
- a first layer $SiO_2$ (innermost layer);
- a second layer $ZrO_2$ (HI layer);
- a third layer $SiO_2$ (LI layer);
- a fourth layer $ZrO_2$ (HI layer); and
- a fifth layer $SiO_2$ (outermost layer).

An electroconductive layer (antistatic layer) is interleaved between the fourth and fifth layers of the anti-reflecting stack.

This electroconductive layer has a physical thickness of 6.50 nm and was formed by vacuum evaporation deposition of indium oxide doped with tin.

The deposition rate is 0.55 Å/s.

This layer is applied under ion ($O_2$) assistance using an ion gun. Pressure during deposition varies from $5 \cdot 10^{-5}$ to $7 \cdot 10^{-5}$ mbar.

Parameters of the ion gun are 100V; 1.2 A, the neutralization current is 5% of the anode current.

When it is not specified, the gas introduced in the vacuum chamber to get the required pressure is $O_2$.

Different first (innermost) layers were formed on lenses n° 1 to 6 by vacuum evaporation deposition of $SiO_2$. Deposition conditions and physical thicknesses of the first layers are given in Table I below

TABLE I

| Lens n° | Physical thickness nm | Deposition rate nm/s | Pressure inside the vacuum chamber mbar(×10⁴) |
|---|---|---|---|
| 1 | 56 | 2 | 1.2 |
| 2 | 112 | 2 | 1.2 |
| 3 | 112 | 2 | 2 |
| 4 | 200 | 1.17 | 2 |
| 5 | 112 | 1.17 | 5 |
| 6 | 200 | 1.17 | 5 |

In all lenses n° 1 to 6, second to fourth layers have then been formed by vacuum evaporation deposition of, respectively $ZrO_2$ and $SiO_2$ under the deposition conditions and with the physical thicknesses indicated in Table II below:

TABLE II

| Layer | Physical thickness nm | Deposition rate nm/s | Pressure inside the vacuum chamber mbar(×10⁴) |
|---|---|---|---|
| Second layer $ZrO_2$ | 31 | 0.3 | 0.1 no $O_2$ added |
| Third layer $SiO_2$ | 21.5 | 0.7 | 0.1 no $O_2$ added |
| Fourth layer $ZrO_2$ | 60 | 0.3-0.5 | 0.1 no $O_2$ added |

In all lenses n° 1 to 6, the fifth (outermost) $SiO_2$ layer is a sandwich layer which has been formed by vacuum evaporation deposition of $SiO_2$ under the deposition conditions and with the physical thicknesses indicated in Table III below.

TABLE III

| Anti-reflecting stack layer | Layer | Physical thickness nm | Deposition rate nm/s | Pressure inside the vacuum chamber mbar(×10⁴) |
|---|---|---|---|---|
| Sandwich layer | Side portions | 15-16 | 0.78 | 0.2 no $O_2$ added |
| | Core portion | 55 | 1.17 | 1.5 |

For comparison, an ophthalmic lens as disclosed above was coated by vacuum evaporation deposition with a classical anti-reflecting stack of the same general layer structure, but without first (innermost) layer and with a fifth (outermost) $SiO_2$ monolayer which is formed under the deposition conditions and with the physical thicknesses indicated in Table IV below.

TABLE IV

| Lens n° | Physical thickness nm | Deposition rate nm/s | Pressure inside the vacuum chamber mbar(×10⁴) |
|---|---|---|---|
| First (innermost) layer Fifth (outermost) layer | 88 | 1 | 0.2 |

3. Characterizations a. Transmission Test According to EN 168

EN 168 transmission test is a test in which the lens is placed over warm water (at 50° C.) and the change of transmission of a laser light through the lens with time is recorded.

This test was modified in the following way: the 100% transmission is measured on the lens before exposure to warm water vapour.

b. Perception Tests

For all the perception tests, a testing chart known as Snellen scale E under the name "Echelle Armaignac" (Tridents), ref. T6, obtained from FAX INTERNATIONAL (January 2005) was used. The person using the test is positioned at a distance from 5 meters from the Snellen scale in monocular vision (one eye is hidden during the test) under a D65 light (day light).

b.1. Vapor Test

The lenses are placed above warmed water at 50° C. during 15 seconds. After removal, a first person is asked to place the fogged lenses in front of his/her eye and to look at the testing chart defined above placed at a set (5 m) distance. The person then informs a second one what he or she can see. The second person records the time and comments. There are two answers: either a reduction of contrast or a distortion of the vision.

The presence of fine droplets on the lens induces reduction of contrast.

The presence of more important drops or of a film of water on the lens induces more or less distortion.

Generally, the distortion does not give a reduction of contrast. On the other hand, for important distortion, the picture of the testing chart is hardly distinguishable while a very important reduction of contrast can nevertheless allow identifying the picture.

Figure 4A:
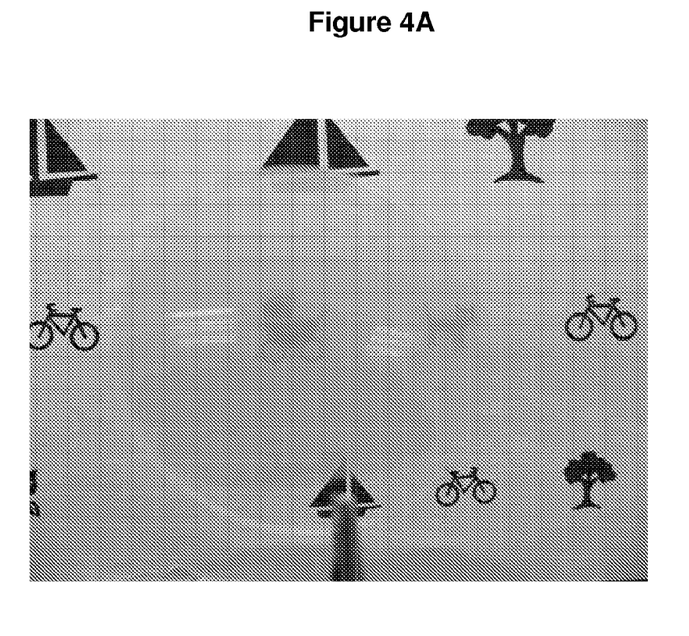
FIGS. 4A and 4B represent is an illustration of the difference between respectively drop in contrast and distortion in a perception test.
Figure 4B:
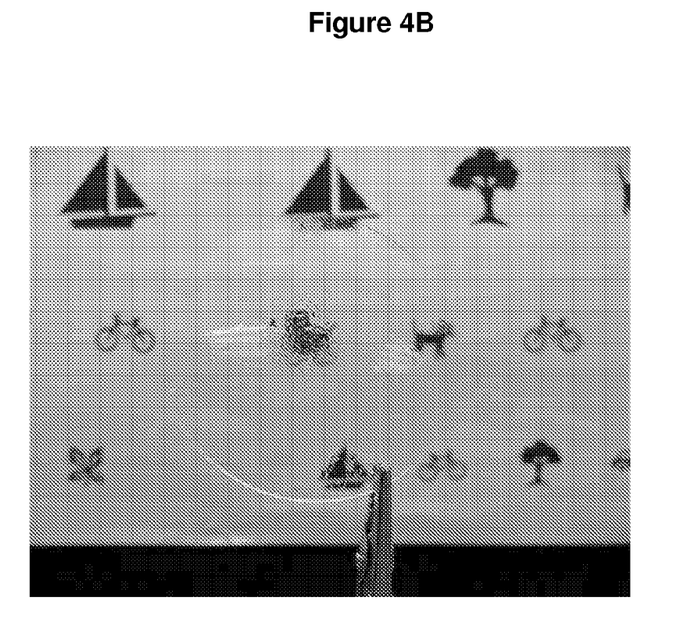

Difference between drop in contrast and distortion is illustrated respectively in FIGS. 4A and 4B.

b.2. Fridge Test

Lenses are put in a hermetic box and placed in a refrigerator at a temperature of 5° C. during 24 hours.

After withdrawal of the lenses from the refrigerator, a subject looks at the acuity chart defined above placed at a distance of 5 meters.

This test comprises two phases, a first fogging phase and a second defogging phase.

Fogging Phase

The test is started as soon as the lens is withdrawn from the refrigerator.

The subject sees the letters less and less until the vision is stabilized. The subject then announces which acuity line he or she can read. The following information's are recorded by the experimenter:

Time to maximum condensation;

If the letters appear clear, more or less contrasted or distorted.

Defogging Phase

Thereafter, the subject says when his vision is completely clear and the experimenter notes the time from maximum condensation to complete clearness.

In the perception tests the testing room is at a temperature of 23±2° C. and relative humidity of 50±5%.

4. Results

Lenses n° 1 to 6 and comparative lens C1 were subjected to the EN 168 transmission test. Results are shown on FIGS. 2A to 2D which are graphs of the transmission (T %) with time (s). These graphs show that the lenses according to the invention have a much slower drop of transmission than the comparative lens C1.

Lens n° 3 and comparative lens C1 were subjected to the above described perception tests. Results are given in FIGS. 3A and 3B which only report the defogging phase.

Figure 3A:
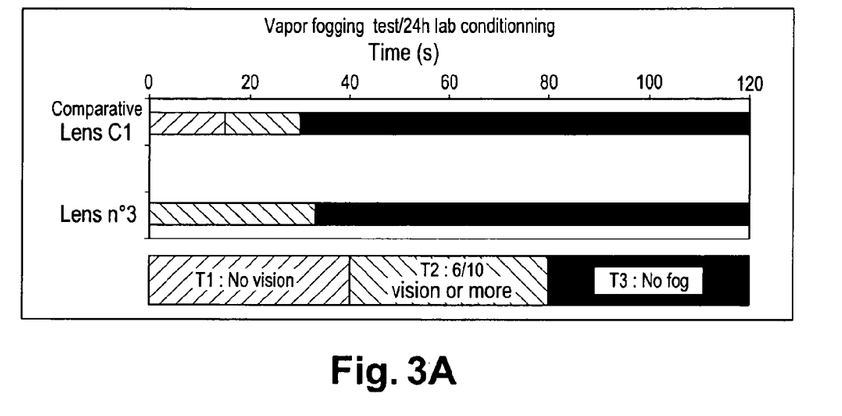
FIGS. 3A and 3B show the results of a perception test for a lens having an anti-reflecting stack according to the invention and a lens having a classical prior art anti-reflecting stack.

It can be seen that, in the vapor fogging test, lens n° 3 according to the invention does not show a period of loss of vision whereas comparative lens C1 exhibits a loss of vision period of more than 15 seconds at the beginning of the test. When fog was present, only a small drop in contrast was noted for lens n° 3.

Figure 3B:
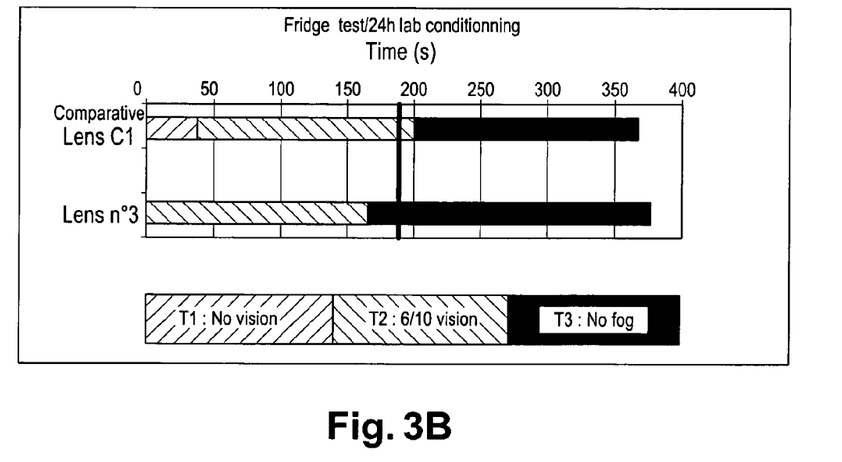

In the fridge test, as shown in FIG. 3B, for lens n° 3 according to the invention no period of loss of vision was noted whereas comparative lens C1 exhibits a period of loss of vision of more than 40 seconds.

The invention claimed is:

1. An optical article having anti-fogging properties, comprising a substrate comprising a front face and a rear face, at least one of these two faces is coated with an anti-reflecting stack of layers of low refractive index (LI) having a refractive index of 1.55 or less and high refractive index (HI) having a refractive index higher than 1.55, said anti-reflecting stack of layers including an outermost layer which is the farthest from the substrate and an innermost layer which is the closest from the substrate, both of said outermost and innermost layer have low refractive index and being made from $SiO_2$, SiOx with $1 \le x < 2$, a mixture of $SiO_2$ and SiOx, a mixture of $SiO_2$ with 10% by weight or less, based on the total weight of the mixture, of $Al_2O_3$, and a mixture of SiOx with 10% by weight or less, based on the total weight of the mixture, of $Al_2O_3$, or a mixture of $SiO_2$ with SiOx and with 10% by weight or less, based on the total weight of the mixture, of $Al_2O_3$, wherein the outermost layer of the anti-reflecting stack is a sandwich layer comprising a core portion interleaved between two side portions, the core portion having a physical thickness ranging from 20 to 150 nm and the side portions having a physical thickness of 1 to 50 nm, the core portion having further a lower density than the one of the side portions, and wherein said innermost layer has a physical thickness ranging from 50 to 500 nm, and a lower density than the one of the side portions.

2. The optical article of claim 1, further defined as produced by a method comprising:

forming the innermost layer by vacuum evaporation deposition at a deposition rate of at least 1.10 nm/s and/or maintaining a pressure higher than $1 \times 10^{-4}$ mbar, in said vacuum chamber by introducing inside the vacuum chamber at least one gas further defined as oxygen and/or an inert gas;

forming the core portion by vacuum evaporation deposition in a vacuum chamber at a deposition rate of at least 1.10 nm/s and/or maintaining a pressure higher than or equal to $1 \times 10^{-4}$ mbar, mbar in said vacuum chamber during deposition by introducing inside said vacuum chamber at least one gas further defined as oxygen and/or an inert gas;

forming the side portions by vacuum evaporation deposition at a deposition rate of less than 1.10 nm/s and maintaining a pressure ranging from $1 \times 10^{-5}$ mbar to less than $1 \times 10^{-4}$ mbar inside the vacuum chamber;

so as to obtain a core portion and an innermost layer having a lower density than the one of the side portions.

3. The optical article of claim 2, wherein, during the forming of the side portions oxygen and/or an inert gas are introduced into the vacuum chamber.

4. The optical article of claim 2, wherein the side portions of the outermost layer are formed by gradually modifying the deposition rate and/or the pressure inside the vacuum chamber during the vacuum evaporation deposition.

5. The optical article of claim 1, wherein the side portions of the outermost layer of the anti-reflecting stack have a physical thickness of 2 to 20 nm.

6. The optical article of claim 1, wherein the side portions of the outermost layer of the anti-reflecting stack have a physical thickness of 4 to 20 nm.

7. The optical article of claim 1, wherein the material of the outermost and innermost layers of the anti-reflecting stack is $SiO_2$.

8. The optical article of claim 1, wherein the layers of the anti-reflecting stack, other than the innermost and outermost layers, are made of alternate LI and HI layers.

9. The optical article of claim 8, wherein:

the LI layers are made of $SiO_2$, $SiO_x$ with $1 \le x \le 2$, $MgF_2$, $ZrF_4$, $AlF_3$, chiolite ($Na_5Al_{13}F_{14}$), cryolite ($Na_3[AlF_6]$), mixture of $SiO_2$ with 10% or less of Al2O3, mixture of $SiO_x$ with 10% or less of $Al_2O_3$, and a mixture of SiO2, $SiO_x$ and 10% or less of $Al_2O_3$, or mixtures thereof;

the HI layers are made of $ZrO_2$, $TiO_2$, $Ta_2O_5$, $Nd_2O_5$, $Pr_2O_3$, $PrTiO_3$, $La_2O_3$, $Dy_2O_5$, $Nb_2O_5$, $Y_2O_3$, mixtures thereof and mixtures of theses oxides with silica and/or alumina.

10. The optical article of claim 1, wherein the anti-reflecting stack further comprises an electrically conductive layer.

11. The optical article of claim 1, further comprising an anti-soiling coating deposited on the anti-reflecting stack.

12. The optical article of claim 11, wherein the anti-soiling coating is made of a fluorinated polymer.

13. The optical article of claim 1, further comprising an abrasion and/or scratch resistant coating.

14. The optical article of claim 1, wherein the article is an ophthalmic lens.

15. The optical article of claim 14, wherein the article is a spectacle eyeglass.

16. A method of fabricating an optical article of claim 1, comprising:
providing a substrate comprising a front face and a rear face;
depositing, on at least one of the front face or of the rear face of the substrate, an anti-reflecting stack of layers of low refractive index (LI), having a refractive index of 1.55 or less, and of high refractive index (HI), having a refractive index higher than 1.55, said anti-reflecting stack of layers including an outermost layer which is the farthest from the substrate and an innermost layer which is the closest from the substrate, said outermost layer being a sandwich layer comprising a core portion interleaved between two side portions, both of said outermost and innermost layer having low refractive index and being made from: $SiO_2$, $SiO_x$ with $1 \leq x < 2$, a mixture of $SiO_2$ and SiOx, a mixture of $SiO_2$ with 10% or less of $Al_2O_3$, and a mixture of $SiO_x$ with 10% or less of $Al_2O_3$, or a mixture of $SiO_2$, $SiO_x$ with 10% or less of $Al_2O_3$, wherein:
a physical thickness ranging from 50 to 500 nm of the innermost layer is formed by vacuum evaporation deposition at a deposition rate of at least 1.10 nm/s and/or maintaining a pressure higher than $1 \times 10^{-4}$ mbar, mbar in said vacuum chamber by introducing inside the vacuum chamber at least one gas further defined as oxygen and/or an inert gas;
a physical thickness ranging from 20 to 150 nm, of the core portion is formed by vacuum evaporation deposition in a vacuum chamber at a deposition rate of at least 1.10 nm/s and/or maintaining a pressure higher than or equal to $1 \times 10^{-4}$ mbar in said vacuum chamber during deposition by introducing inside said vacuum chamber at least one gas further defined as oxygen and/or an inert gas;
a physical thickness ranging from 1 to 50 nm of the side portions is formed by vacuum evaporation deposition at a deposition rate of less than 1.10 nm/s and maintaining a pressure ranging from $1 \times 10^{-5}$ mbar to less than $1 \times 10^{-4}$ mbar inside the vacuum chamber.

17. The method of claim 16, wherein, during the forming of the side portions oxygen and/or an inert gas are introduced into the vacuum chamber.

18. The method of claim 16, wherein the core portion of the outermost layer and the innermost layer of the anti-reflecting stack are formed at a deposition rate of 1.10 nm/s or more and under a pressure inside said vacuum chamber of $1.2 \times 10^{-4}$ mbar or more.

19. The method of claim 18, wherein said pressure ranges from $1.2 \times 10^{-4}$ mbar to $5 \times 10^{-4}$ mbar.

20. The method of claim 16, wherein, for both the core portion of the outermost layer and the innermost layer of the anti-reflecting stack, the deposition rate ranges from 1.17 to 2 nm/s.

21. The method of claim 16, wherein the side portions of the outermost layer are formed by gradually modifying the deposition rate and/or the pressure inside the vacuum chamber during the vacuum evaporation deposition.

22. The method of claim 16, wherein the gas at least one gas is $N_2$ or a rare gas.

23. The method of claim 16, wherein the at least one gas is oxygen.

24. The optical article of claim 1, comprising a substrate having at least one main face coated with an anti-reflecting stack of layers of low refractive index (LI) and high refractive index (HI) including an outermost and an innermost layer, wherein the outermost layer of the anti-reflecting stack is a sandwich layer comprising a core portion interleaved between two side portions, said core portion being made of $SiO_2$, $SiO_x$ with $1 \leq x < 2$, a mixture of $SiO_2$ and $SiO_x$ or a mixture of $SiO_2$ and/or $SiO_x$ with 10% by weight or less, based on the total weight of the mixture, of $Al_2O_3$, having a physical thickness ranging from 20 to 150 nm, preferably 30 to 80 nm and being formed by vacuum evaporation deposition in a vacuum chamber at a deposition rate of at least 1.10 nm/s and/or maintaining a pressure higher than or equal to $1 \times 10^{-4}$ mbar, preferably ranging from $1.2 \times 10^{-4}$ mbar to $5 \times 10^{-4}$ mbar in said vacuum chamber during deposition by introducing inside said vacuum chamber at least one gas selected from the group consisting of oxygen, an inert gas or a mixture thereof, the side portions being made of a material selected from the same materials as for the core portion, having a physical thickness of 1 to 50 nm, preferably 2 to 20 nm and being formed by vacuum evaporation deposition at a deposition rate of less than 1.10 nm/s and maintaining a pressure ranging from $1 \times 10^{-5}$ mbar to less than $1 \times 10^{-4}$ mbar, preferably from $0.2 \times 10^{-4}$ to $0.5 \times 10^{-4}$ mbar inside the vacuum chamber, optionally by introducing at least one gas selected from the same group as for the core portion, and,
wherein the innermost layer is made of a material selected from the same group as for the core portion of the outermost layer, said innermost layer having a physical thickness ranging from 50 to 500 nm, preferably 100 to 300 nm and being formed by vacuum evaporation deposition at a deposition rate of at least 1.10 nm/s and/or maintaining a pressure higher than or equal to $1 \times 10^{-4}$ mbar, preferably ranging from $1.2 \times 10^{-4}$ mbar to $5 \times 10^{-4}$ mbar in said vacuum chamber by introducing inside said vacuum chamber at least one gas selected from the group consisting of oxygen, an inert gas or a mixture thereof.

* * * * *